(12) United States Patent
Fujiwara

(10) Patent No.: US 7,321,688 B2
(45) Date of Patent: Jan. 22, 2008

(54) IMAGE PROCESSOR FOR CHARACTER RECOGNITION

(75) Inventor: Yoko Fujiwara, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 784 days.

(21) Appl. No.: 09/875,081

(22) Filed: Jun. 7, 2001

(65) Prior Publication Data

US 2002/0015525 A1    Feb. 7, 2002

(30) Foreign Application Priority Data

Jun. 9, 2000    (JP) .............................. 2000-173727

(51) Int. Cl.
*G06K 9/34*    (2006.01)

(52) U.S. Cl. ...................... 382/176; 382/182; 382/224; 382/282

(58) Field of Classification Search ............... 358/1.11, 358/1.15, 403, 450, 505, 540; 382/164–165, 382/170, 172, 175–177, 179, 190, 209, 217–218, 382/224–225, 229–230, 275, 282–284, 318–321, 382/198, 173, 182, 181, 184; 715/505–506

See application file for complete search history.

(56) References Cited

U.S. PATENT DOCUMENTS

| | | | | |
|---|---|---|---|---|
| 4,813,078 A | * | 3/1989 | Fujiwara et al. ............. | 382/185 |
| 5,086,434 A | * | 2/1992 | Abe et al. .................... | 375/219 |
| 5,212,739 A | * | 5/1993 | Johnson ....................... | 382/177 |
| 5,495,565 A | * | 2/1996 | Millard et al. ............... | 715/506 |
| 5,640,466 A | * | 6/1997 | Huttenlocher et al. ...... | 382/177 |
| 5,745,600 A | * | 4/1998 | Chen et al. .................. | 382/218 |
| 5,754,308 A | * | 5/1998 | Lopresti et al. ............. | 358/403 |
| 5,784,501 A | * | 7/1998 | Tanaka ........................ | 382/286 |
| 5,907,835 A | * | 5/1999 | Yokomizo et al. ............. | 707/1 |
| 5,920,655 A | * | 7/1999 | Makita et al. ............... | 382/272 |
| 5,930,404 A | * | 7/1999 | Hattori ........................ | 382/283 |
| 5,995,665 A | * | 11/1999 | Maeda ......................... | 382/232 |
| 6,023,534 A | * | 2/2000 | Handley ....................... | 382/275 |
| 6,064,769 A | * | 5/2000 | Nakao et al. ................ | 382/224 |
| 6,072,598 A | * | 6/2000 | Tso ............................. | 358/442 |

(Continued)

FOREIGN PATENT DOCUMENTS

JP    5-37700    2/1993

(Continued)

*Primary Examiner*—Gregory Desire
(74) *Attorney, Agent, or Firm*—Buchanan Ingersoll & Rooney PC

(57) ABSTRACT

In image processing of a document having image data of a document including an image with character images on a background image, the character images and the background image thereof are separated. First, areas in correspondence to the character images from the image data are extracted, and character code data are generated based on the extracted areas in the image data. On the other hand, the character image in the image data is replaced with the background image. The character images are reproduced with reference to the character code data at the positions of the character images. On the other hand, the original character images are deleted from the image data. The character images on the background image is complemented based on the background image data. Then the character images based on the character code data and the background image thereof are synthesized.

17 Claims, 9 Drawing Sheets

U.S. PATENT DOCUMENTS

| | | | |
|---|---|---|---|
| 6,088,479 A * | 7/2000 | Ikeshoji et al. | 382/170 |
| 6,141,443 A * | 10/2000 | Nakao et al. | 382/174 |
| 6,151,423 A * | 11/2000 | Melen | 382/289 |
| 6,163,623 A * | 12/2000 | Ohta | 382/176 |
| 6,285,459 B1 * | 9/2001 | Koakutsu et al. | 358/1.15 |
| 6,289,121 B1 * | 9/2001 | Abe et al. | 382/175 |
| 6,389,162 B2 * | 5/2002 | Maeda | 382/172 |
| 6,453,079 B1 * | 9/2002 | McInerny | 382/311 |
| 6,633,670 B1 * | 10/2003 | Matthews | 382/176 |
| 6,641,053 B1 * | 11/2003 | Breidenbach et al. | 235/494 |
| 6,683,967 B1 * | 1/2004 | Takahashi | 382/101 |
| 6,731,800 B1 * | 5/2004 | Barthel et al. | 382/176 |
| 6,735,337 B2 * | 5/2004 | Lee et al. | 382/220 |
| 6,885,768 B2 * | 4/2005 | Fujiwara | 382/181 |
| 6,937,762 B2 * | 8/2005 | Fujiwara | 382/182 |
| 6,975,761 B1 * | 12/2005 | Swann et al. | 382/173 |
| 7,149,352 B2 * | 12/2006 | Fujiwara | 382/181 |
| 2002/0015525 A1 * | 2/2002 | Fujiwara | 382/182 |

FOREIGN PATENT DOCUMENTS

| | | |
|---|---|---|
| JP | 09/091371 | 4/1997 |
| WO | WO03041014 A1 * | 5/2003 |

* cited by examiner

DOCUMENT

OUTPUT EXAMPLE

DOCUMENT

OUTPUT EXAMPLE

3×3 MAXIMUM FILTER

OBJECT PIXEL

IMAGE PROCESSOR FOR CHARACTER RECOGNITION

This application is based on application No. 2000-173727 filed in Japan, the contents of which are hereby incorporated by reference.

BACKGROUND OF THE INVENTION

1. Field of the Invention

The present invention relates to optical character recognition which converts character images in image data to character code data.

2. Description of Prior Art

In character recognition by using an optical character recognition apparatus, characters in a text image in a document are recognized. As to a document including text image and the other image, it is known to further recognize the layout of the document and to arrange data of the other image at relevant positions in the layout as bit map image data. The layout, the character code data and the bit map image data are outputted as one file.

However, when a document has characters on a background image, after converting the character image data to character code data, it is difficult to synthesize the recognized characters (character images based on the character code data) with the original image data. This is due to difference in the font and the positions of the characters in the original image data with the counterparts based on the conversion data.

In prior art character recognition, it is known, for example, as shown in FIG. 1, to convert the character image data in a document while not to output the background image. It is also known, as shown in FIG. 2, to superpose the character code data obtained by the conversion on the image data of the document and to output the superposed image. However, in the former, the background image is not reproduced, and the information is lost partly. In the latter, the output image of the character code data is liable to be shifted from that of the character image data, or the output image becomes obscure.

SUMMARY OF THE INVENTION

An object of the present invention is to provide image processing which can reproduce characters on the background image well.

In the present invention, character images and the background image thereof are separated in image data of a document including an image with the character images on the background image. First, areas in correspondence to the character images from the image data are extracted, and character code data are generated based on the extracted areas in the image data. On the other hand, the character image in the image data is replaced with the background image. The character images are reproduced with reference to the character code data at the positions of the character images. On the other hand, the original character images are deleted from the image data. The character images on the background image is preferably complemented based on the background image data. Then the character images based on the character code data and the background image thereof are synthesized. Thus, the synthesized image is reproduced well.

An advantage of the present invention is that a document image is reproduced well for character images on the background image.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
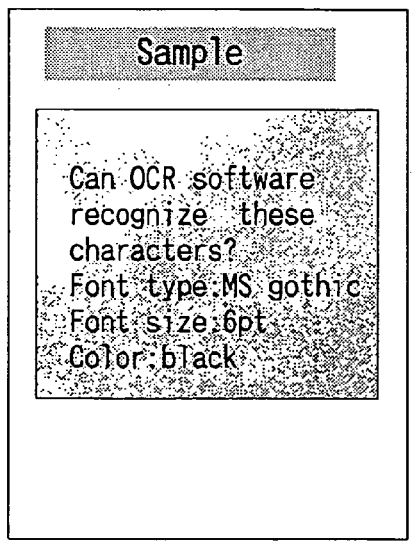
FIG. 1 is a diagram of a prior art example of a document and an output image thereof.
Figure 1:
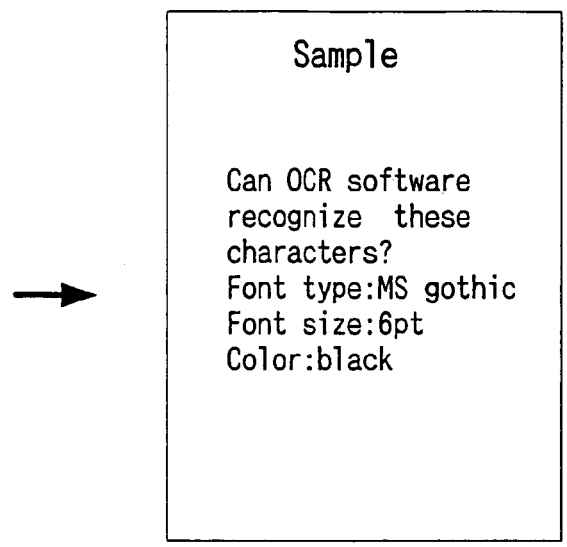
Figure 2:
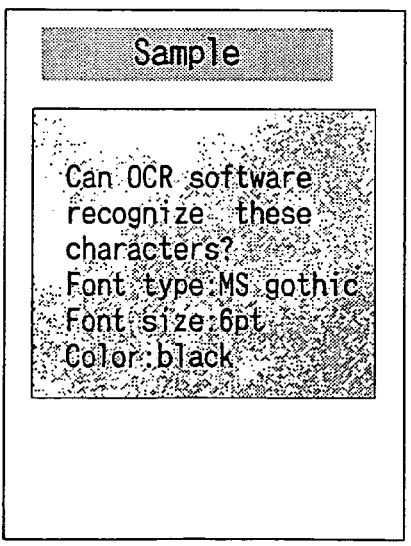
FIG. 2 is a diagram of another prior art example of a document and an output image thereof.
Figure 2:
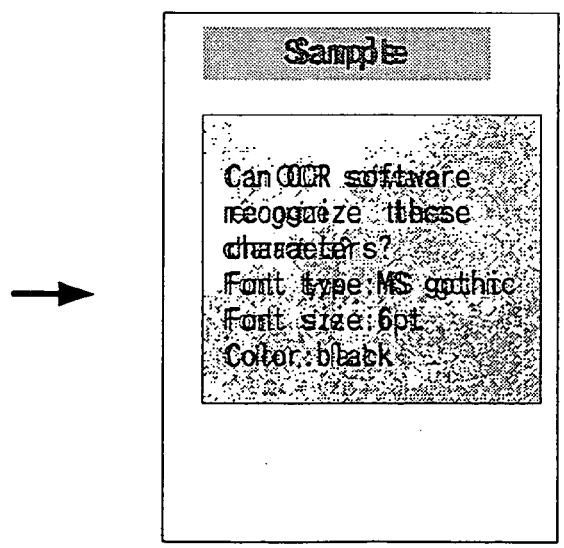
Figure 3:
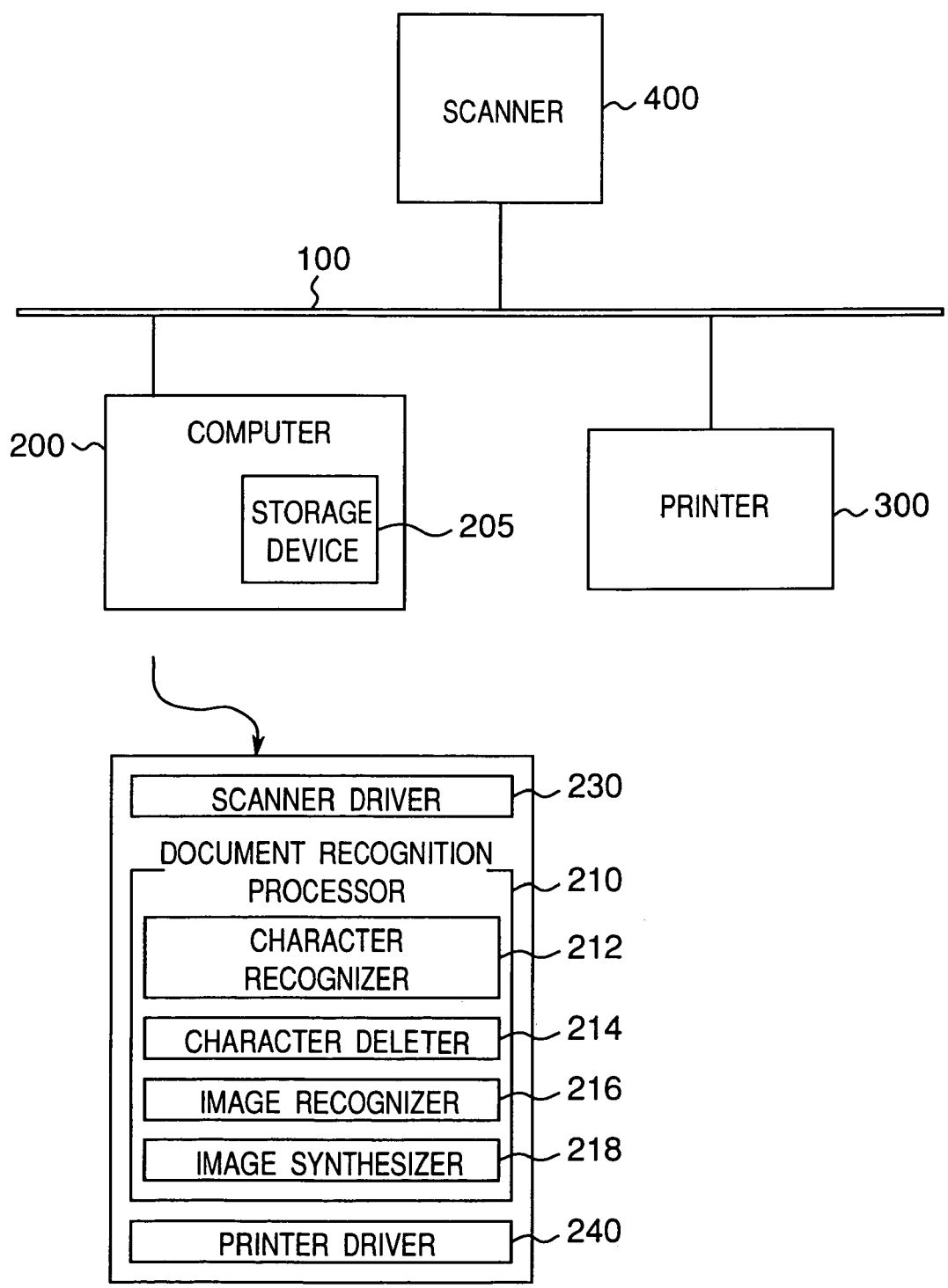
FIG. 3 is a diagram of a system of an image recognition apparatus.

Referring now to the drawings, wherein like reference characters designate like or corresponding parts throughout the several views, FIG. 3 shows a structure of a system according to a first embodiment of the invention, wherein a computer 200 as a character recognition apparatus has a function of character recognition. The computer 200, a printer 300 as an image output apparatus and a scanner 400 as an image input apparatus are connected to a network 100. The computer 200 has a storage device 205 such as a random access memory or a hard disk for storing various programs and data, as well as a central processing unit (CPU) not shown in FIG. 3. The computer 200 processes the image data read by the scanner 400. However, the processing may be performed similarly in the scanner 400 or in the printer 300. Further, the invention may be applied to a stand-alone digital copying machine.

The computer 200 has software programs such as a scanner driver 230 and a printer driver 240 which control the peripheral devices. For example, the scanner driver 230 instructs to set reading conditions and to start reading for the scanner 400, in a screen in the computer 200.

In a document recognition processor 210 in the computer 200, images on the background image in a document are separated into the character images and the background bit map image. Characters are recognized in the character images with use of optical character recognition technique, while the character images are deleted from the image data. Then, they are synthesized again to reproduce the original document.

In this embodiment, the computer 200 has the function of the character recognition, but the character recognition function may also be incorporated in an image input apparatus or an image output apparatus. The image output apparatus is not limited to the printer 300, and it may be, for example, a display device. The image input apparatus is not limited to the scanner 400, and it may be a device such as a digital camera or a film scanner which inputs a digital image.

In the document recognition processor 210, a document recognition processor 210 extracts character image data from image data which may include a character image on a background image and converts the extracted character image data to character code data with optical character recognition. Further, the image data of the character image on a background image is complemented with reference to the ambient background image data. Then, image data based on the character code data are synthesized with the complemented image data. Practically, a character recognizer 212 recognizes character image data in the image data obtained by reading a document and converts the character image data to character code data. A character deleter 214 deletes the recognized character code data from the original image data, and an image recognizer 216 recognizes image data such as a photograph or a design other than the white space (or an area having no image). An image synthesizer 218 synthesizes the character code data with the image data recognized by the image recognizer 216. Thus, the character image data included in the original document does not overlap the character code data. Further, by storing the character code data and the background image included in a document in the storage device 205, the character image data included in the document can be edited or changed by using the character code data. The character code data can also be used as key words for search.

Figure 4:
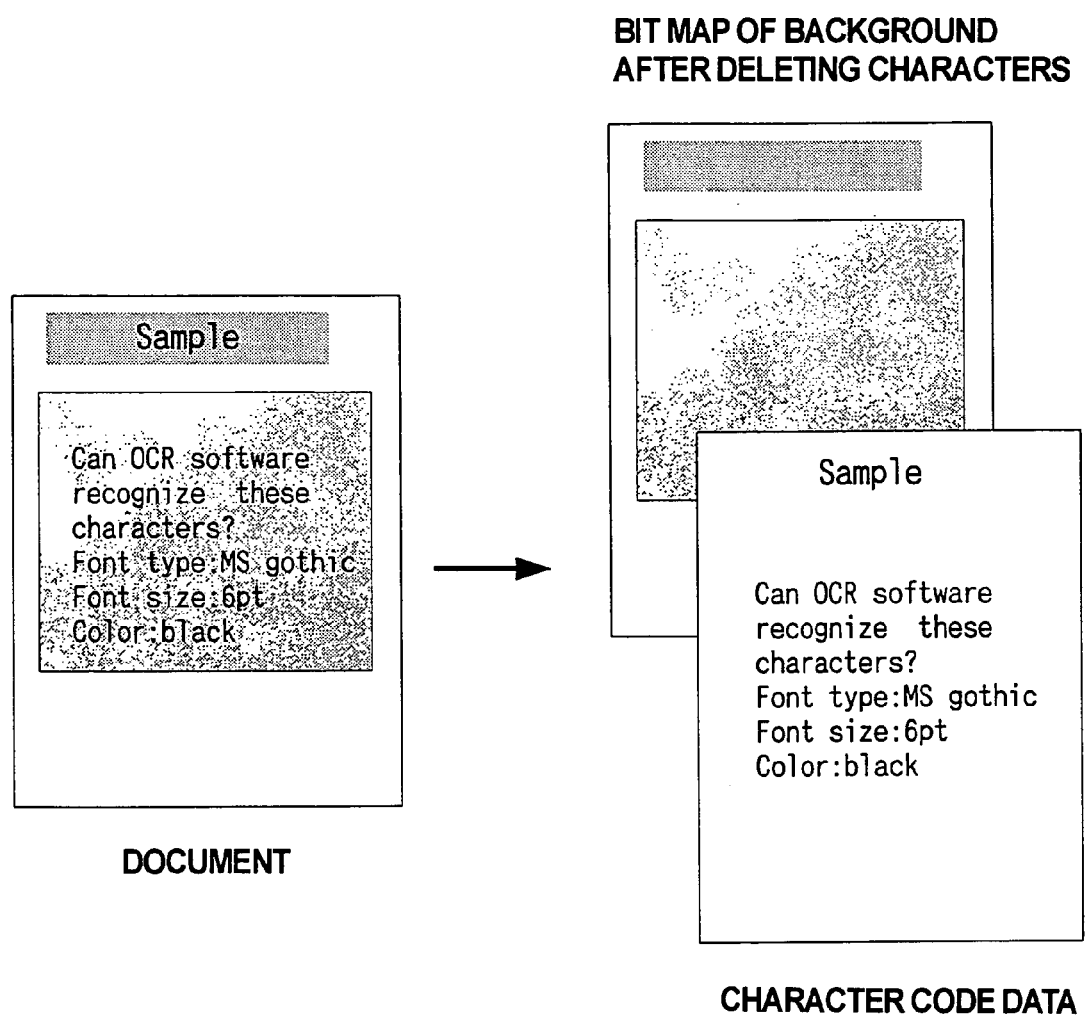
FIG. 4 is a diagram of an example of image data output.

FIG. 4 shows document recognition by the document recognition processor 210 schematically. A document having characters on the background image is shown in the left side in FIG. 4. The image data of the character code data converted by the character recognizer 212 on the character image data in the document is shown in the lower portion in the right side, while the upper portion in the right side shows the bit map image data after deleting the character image data in the document by the character deleter 214 from the image recognized by the bit map image recognizer 216.

Figure 5:
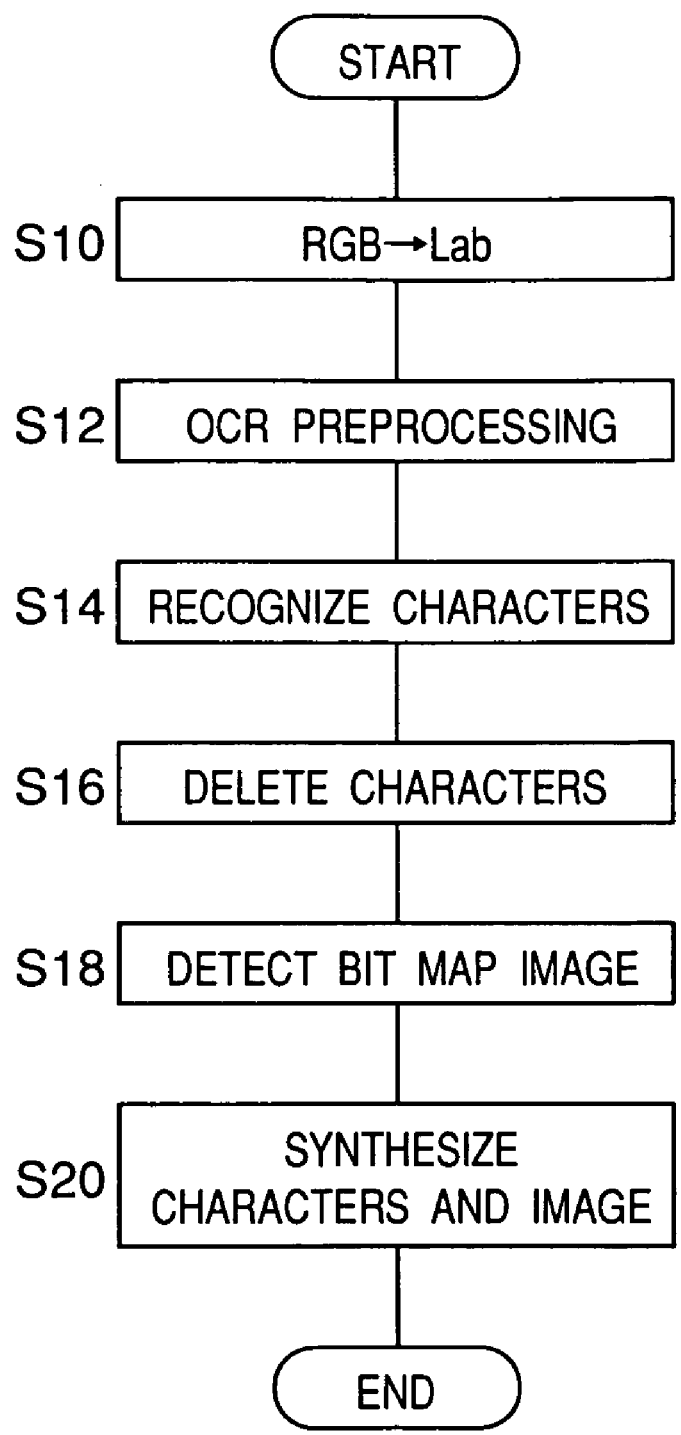
FIG. 5 is a flowchart of image processing.

FIG. 5 is a flowchart of image processing in the document recognition processor 210. First, image data of R (red), G (green) and B (blue) components obtained by reading a document by the scanner 400 are converted to image data in a different color space of L, a and b components independent of characteristics of a scanner device (S10).

Next, preprocessing for optical character recognition (OCR) is performed on the image data in the converted color space, in order to enhance recognition efficiency in the character recognizer 212 (S12). Practically, the image data of L, a and b components are subjected to binarization so that character image data become black and the background image becomes white. The image data of L, a and b components are stored in a different place (memory). Further, in the preprocessing of optical character recognition, for example, noises included in the image data such as an isolated point may be deleted, inclination of the image data due to misplacement of a document on document reading may be corrected, or deformed characters may be corrected. In this example, the preprocessing is performed on the image data of L, a and b components, but it may be performed on the image data of R, G and B components before the conversion of color space.

Figure 6:
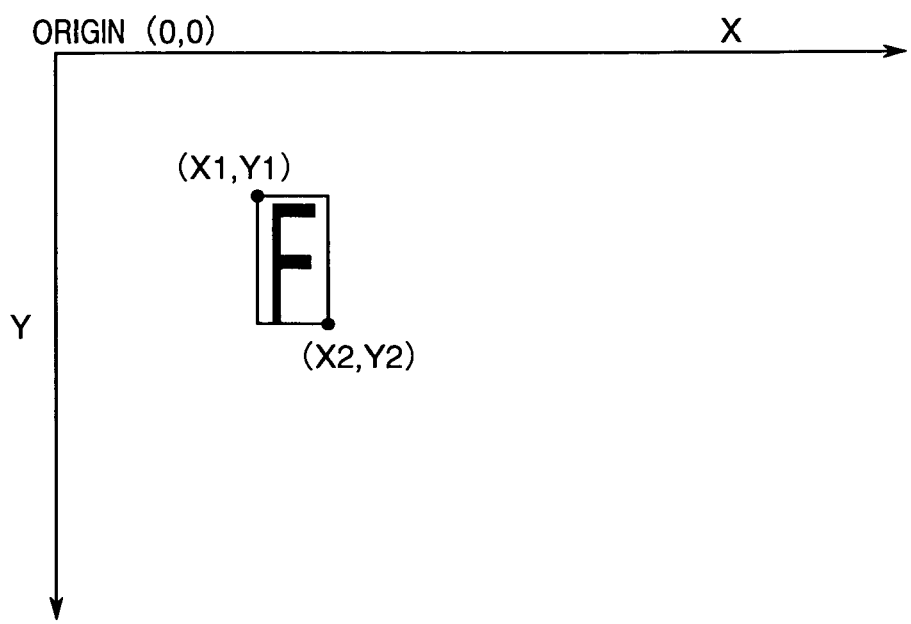
FIG. 6 is a diagram of a character with a circumscribing rectangle thereof.

Next, in the character recognizer 212, lines consisting of character image data included in the image data and each character image data in the lines are taken out from the image data. Then, character code, font, font size and the like are recognized on each character image data (S14). The character code data is determined, for example, for each character in this embodiment. It may also be performed in the unit of word. As to the font and font size, the most similar font and font size are selected among the font data group in the document recognition processor 210. The character recognizer 212 outputs position coordinates (X1, Y1) and (X2, Y2) of a rectangle having the origin (0, 0) at the top leftmost point, as shown in FIG. 6, as position data of the recognized character image data.

Figure 7:
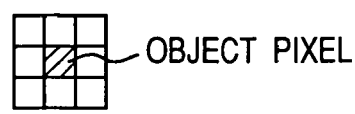
FIG. 7 is a diagram of a maximum filter.

When color is changed within a character, the character is regarded a result of erroneous recognition on an image other than the character, and it is not converted to character code data. That is, character image data including color change is not converted to character code data. In the preprocessing for optical character recognition (S12), the binarization is performed on the image data of L, a and b components, while the image data is stored in a different place. The color of a character is detected from the above-mentioned stored image data. Practically, by using the 3*3 maximum filter as shown in FIG. 7, filtering is performed to determine the maximum in the ambient 3*3 pixels in the input monochromatic bi-level image for character recognition. Then, the character portion is contracted. This is performed in order to delete influence of an edge of a character. Then, the image obtained by the contraction on the bi-level image and the circumscribing rectangle obtained by character recognition are subjected to an AND operation, and an average data on the pixels in the image is determined as the color of the character. That is, when $C_j$ represents color image data of the j-th character in the Lab space, $$C_j = \left( \sum_{i=1}^{N} Li/N, \sum_{i=1}^{N} ai/N, \sum_{i=1}^{N} bi/N \right), \quad (1)$$

wherein N denotes a number of pixels of the j-th character.

Figure 8:
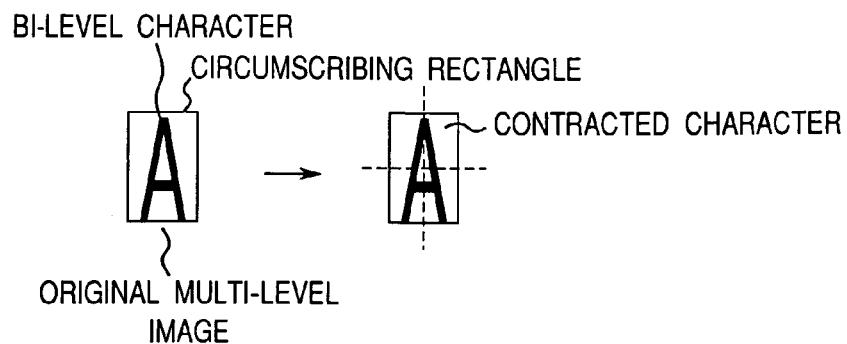
FIG. 8 is a diagram for explaining color detection.

In the decision of color change, the circumscribing rectangle of a character after the subtraction is divided into four areas as shown in FIG. 8 with dashed lines, and the averages of L, a and b values in each area are compared. If the averages of L, a and b values in the four areas are different by more than a threshold value, the color is decided to be changed. If $C_{j1}$ to $C_{j4}$ represent the L, a and b values in the four areas, $$C_{j1} = (L_{j1}, a_{j1}, b_{j1}),$$

$$C_{j2} = (L_{j2}, a_{j2}, b_{j2}),$$

$$C_{j3} = (L_{j3}, a_{j3}, b_{j3}), \quad (2)$$

and $$C_{j4} = (L_{j4}, a_{j4}, b_{j4}).$$

It is decided that the color is changed when the following condition is satisfied, $$|L_{jn} - L_{jm}| \geq k1,$$

$$|a_{jn} - a_{jm}| \geq k2, \quad (3)$$

or $$|b_{jn} - b_{jm}| \geq k3,$$

wherein n=1, 2, 3 or 4, and m=1, 2, 3 or 4, and k1, k2 and k3 denote constants. The above-mentioned average image data $C_j$ of the character is determined actually by determining the averages of the four areas first and by further averaging the four averages. When the color is changed in a character, the above-mentioned conversion to character code data is not performed.

Figure 9:
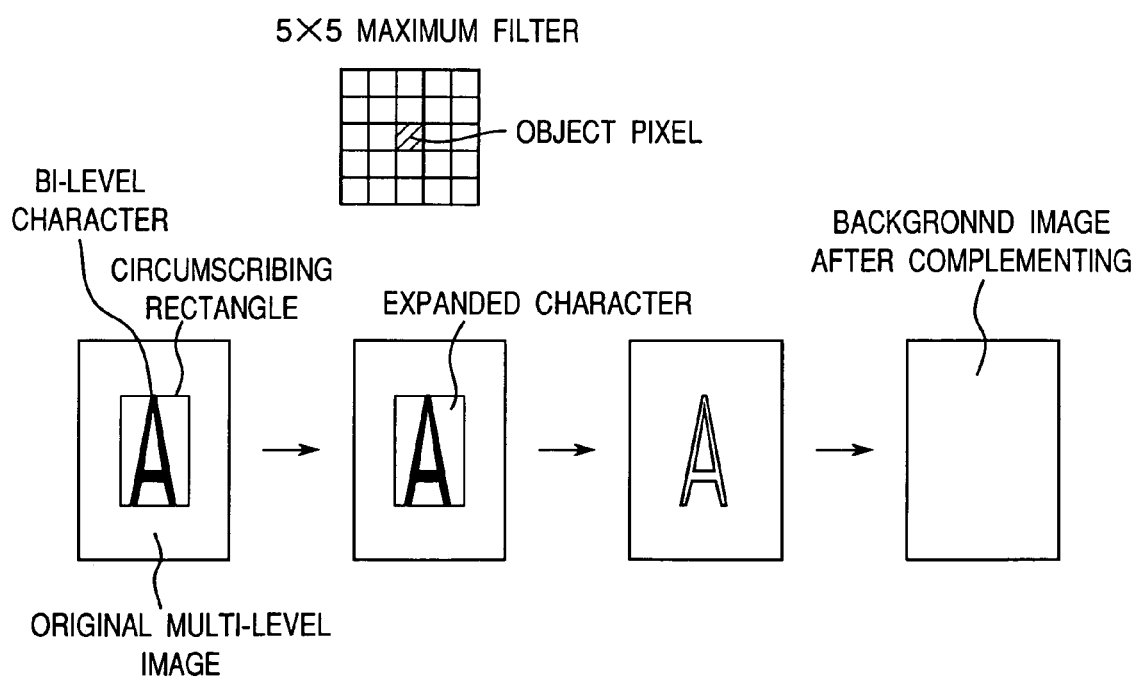
FIG. 9 is a diagram of character deletion.

Next, in the character deleter 214, character image data recognized in the character recognizer 212 is deleted from the original image data of L, a and b components (S16). As mentioned above, the original image data are stored in the different place in the binarization process in the preprocessing at step S12. In the character deletion, the binarized image data are subjected to filtering with use of a 5*5 minimum filter shown in FIG. 9 in order to expand the character image data. Then, image data of L, a and b components in correspondence to the expanded character image data are converted to white, as shown with a dashed line in FIG. 9.

Figure 10:
FIG. 10 is a diagram on the order of pixel positions for searching complementary data.
Figure 10:
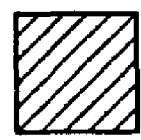

Next, the image data of L, a and b components after the conversion to white is subjected to filtering with a 7*7 filter shown in FIG. 10, so that the image data are complemented according to the values of ambient pixels (S18).

Figure 11:
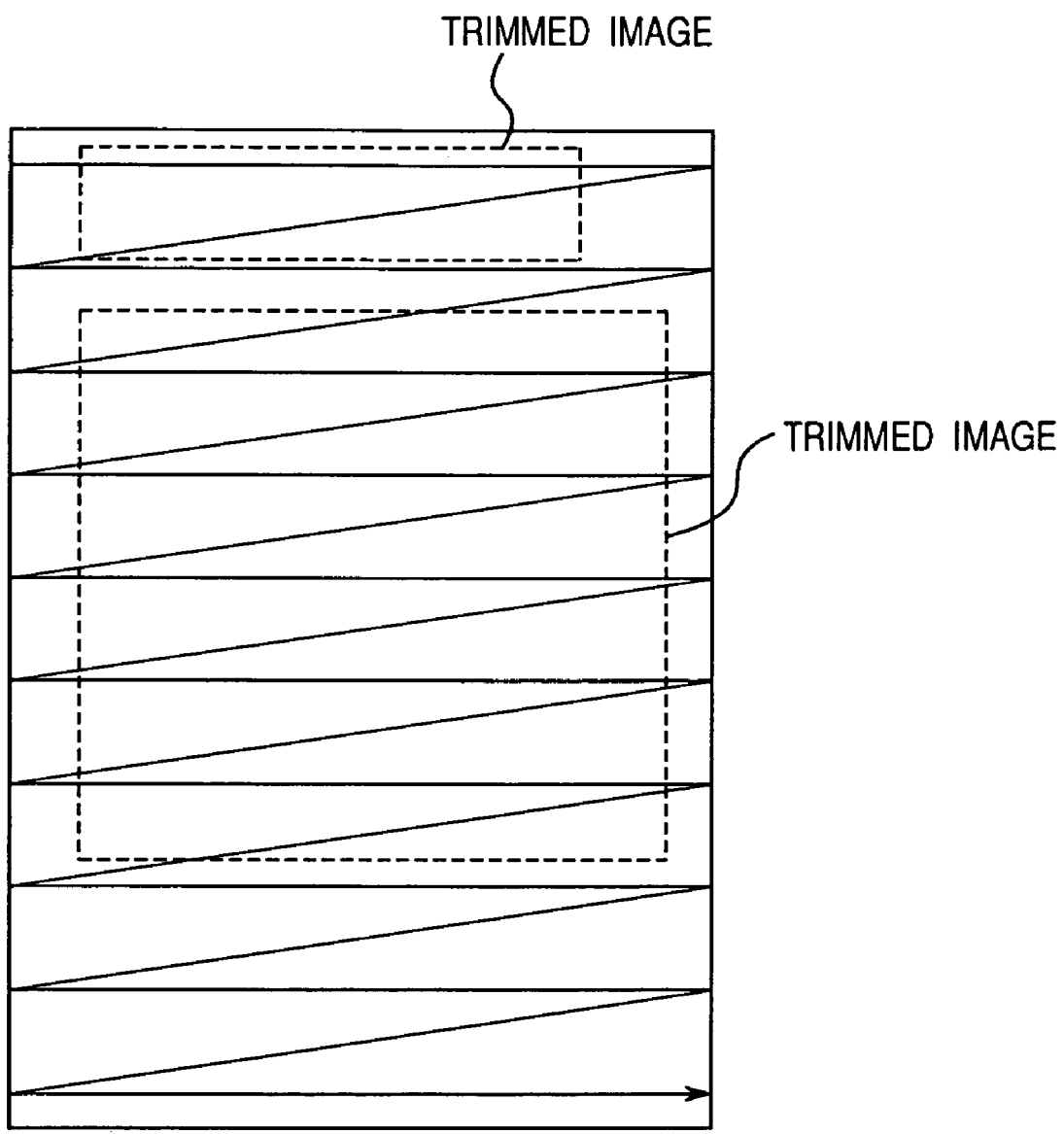
FIG. 11 is a diagram for explaining trimming of image data.

An object pixel shown in FIG. 10 is a pixel in the image portion changed to white, and the numbers in the filter illustrate the order of the ambient pixels for reference. According to the order in the filter, it is checked whether the pixel is a non-white pixel or not in the eight directions of vertical, horizontal and oblique directions, and the object pixel is corrected as an average of the first to third non-white pixels. Thus, image data consisting only of the background image with no character image are generated. Further, in order to decrease the amount of image data, only the necessary portion in the image data is extracted and stored. As shown in FIG. 11 schematically, the image data only of the background image is scanned sequentially from the top leftmost position, and areas having densities larger than a threshold is trimmed as rectangular bit map image data as shown with dashed lines.

Figure 12:
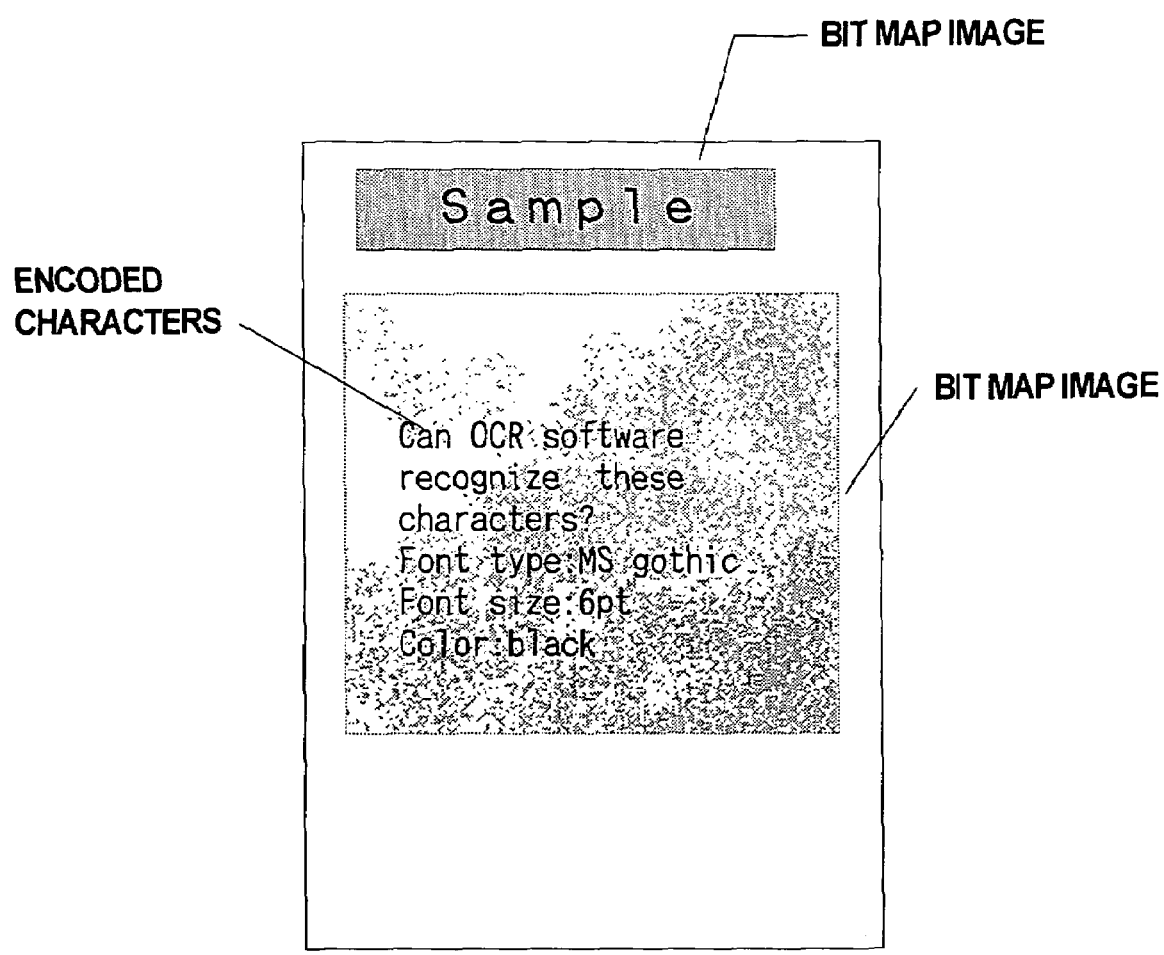
FIG. 12 is a diagram of a synthesized image.

The bit map image data only of the background image generated as mentioned above and the character code data recognized in the character recognizer 212 are arranged and synthesized as shown in FIG. 12 (S20). The synthesis process depends on the format of output file. For example, in rich text format (RTF) or portable document format (PDF), the image data and character data are dealt as different objects. Then, as shown in FIG. 12, the image is arranged at the lower portion, while character code data overwrites the image for synthesis.

In the above-mentioned embodiment, characters on the background image in a document are separated into the character code data and the background bit map image, from which characters are deleted, and they are synthesized again to reproduce the document. Therefore, the system has following advantages.

(1) The encoded characters are not reproduced doubly with the character image, and the output image reproduces the background of the document.

(2) Further, because characters on the background can be encoded, the output character image can be read easily, the character size can be changed, or the characters can be used for search.

(3) Still further, data in the background can be used again. For example, when the characters are modified, a document having the same background can be generated.

(4) Because character image data having a changing color is not converted to character code data, erroneous recognition of non-characters as characters can be decreased.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of image processing comprising the steps of:
   receiving image data of an original image, the original image having character images provided on a background image;
   conducting character recognition on the image data including
   preprocessing the image data for character recognition;
   extracting areas from the image data which correspond to the character images; and
   generating character code data based on the extracted character images;
   changing, based on the character recognition, the image data by replacing the extracted areas with the background image with reference to the image data therein generating changed image data representing an image which is same as the original image except without the character images; and
   storing the changed image data and the character code data along with a relationship between them.

2. The method according to claim 1, wherein, in the generating step, the character code data are generated in reference to color information on the character images.

3. A method of image processing comprising the steps of:
   conducting character recognition on image data including
   preprocessing the image data for character recognition; and
   converting character images in the preprocessed image data of an original image to character code data; and
   complementing, based upon the character recognition, the character images based on image data around the character images therein changing image data representing an image which is same as the original image except without the character images.

4. The method according to claim 3, wherein, in the converting step, the character code data are generated in reference to color information on the character images.

5. A method of image processing comprising the steps of:
   conducting character recognition on image data including
   preprocessing the image data for character recognition; and
   converting character images in the preprocessed image data of an original image to character code data;
   complementing, based upon the character recognition, the character images based on image data around the character images therein generating changed image data representing an image which is same as the original image except without the character images; and
   storing the character code data and the changed image data along with a relationship between them.

6. The method according to claim 5, wherein, in the converting step, the character code data are generated in reference to color information on the character images.

7. An image processor comprising:
   a reader which reads an original image of a document to provide image data thereof;
   character recognition device conducting character recognition on the image data including
   a preprocessing device preprocessing the image data for character recognition;
   a converter which determines character code data of character images in correspondence to character image in the image data; and an acquiring device which determines position data on a position in the character images converted to character code data in the image data;

a corrector which, based upon the character recognition, changes the character images to the same as a color of an image around the character image with reference to the image data therein generating changed image data representing an image which is same as the original image except without the character images; and a storage device which stores the character code data and the changed image data including the complemented character images along with a relationship between them.

8. The image processor according to claim 7, wherein said acquiring device further determines font and font size based on the character images in correspondence to the character image in the image data.

9. The image processor according to claim 7, further comprising a processor which generates print data for printing the document image, based on the character code data, the position data and the image data stored in said storage device.

10. The image processor according to claim 7, wherein the converter determines the character code data in reference to color information on the character images.

11. An image processor which converts character images in image data to character code data comprising:

character recognition device conducting character recognition on the image data including
  a preprocessing device preprocessing the image data for character recognition;
  an extractor which extracts character images in the preprocessed image data of an original image, the original image having character images provided on a background image; and
  a converter which converts the extracted character images to character code data;

a deleter which, based on the character recognition, deletes the character images from the background image with reference to the image data therein generating changed image data representing an image which is same as the original image except without the character images; and a synthesizer which synthesizes the character code data with the changed image data.

12. The image processor according to claim 11, wherein said deleter complements the image data at an area of the character images on the background image according to image data of an ambient background image of the area.

13. The image processor according to claim 11, wherein said converter does not convert a character image to a character code data when an area of the character image has color change.

14. The image processor according to claim 11, wherein said extractor extracts character images character by character.

15. The image processor according to claim 11, wherein said extractor extracts the character images in the unit of word.

16. The image processor according to claim 11, wherein the converter converts the extracted character images to the character code data in reference to color information on the character images.

17. A method of image processing comprising the steps of:

receiving image data of an original image, the original image having at least one character image on a background image;

conducting character recognition on the image data including
  preprocessing the image data for character recognition; and
  generating character code data based on the at least one character image with reference to color information on the at least one character image;

generating, based on the character recognition, changed image data representing an image which is same as the original image except without the at least one character image by replacing image data of the at least one character image that has been converted into the character code data with image data of the background image; and storing the changed image data and the character code data along with a relationship between them.

* * * * *